US012249880B2

(12) United States Patent
Arnault et al.

(10) Patent No.: US 12,249,880 B2
(45) Date of Patent: Mar. 11, 2025

(54) GROUNDING BRUSH ASSEMBLY (71) Applicant: AKTIEBOLAGET SKF, Gothenburg (SE)

(72) Inventors: Benoit Arnault, Saint-Cyr-sur-Loire (FR); Samuel Viault, Saint-Antoine-du-Rocher (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 26 days.

(21) Appl. No.: 18/163,311

(22) Filed: Feb. 2, 2023

(65) Prior Publication Data
US 2023/0261555 A1      Aug. 17, 2023

(30) Foreign Application Priority Data

Feb. 11, 2022   (FR) ...................................... 2201203

(51) Int. Cl.
*H02K 11/40*      (2016.01)
*H01R 39/38*      (2006.01)
*H01R 39/39*      (2006.01)

(52) U.S. Cl.
CPC ........... *H02K 11/40* (2016.01); *H01R 39/385* (2013.01); *H01R 39/39* (2013.01)

(58) Field of Classification Search
CPC ........ H02K 11/40; H02K 5/173; H02K 13/00; H01R 39/385; H01R 39/39; H01R 39/64;
(Continued)

(56) References Cited

U.S. PATENT DOCUMENTS

2004/0218843 A1* 11/2004 Jennes .................... F16C 19/06
                                                         384/498
2006/0007609 A1    1/2006 Oh et al.
(Continued)

FOREIGN PATENT DOCUMENTS

DE    102020121735 A1    6/2021
DE    102020121736 A1 *  6/2021   ............. H02K 11/40
(Continued)

OTHER PUBLICATIONS

Preliminary Search Report and Written Opinion from the French Patent Office dated Oct. 24, 2022 in related No. FR2201202, and translation thereof.
(Continued)

*Primary Examiner* — Tulsidas C Patel
*Assistant Examiner* — Joshua Kiel M Rodriguez
(74) *Attorney, Agent, or Firm* — J-TEK LAW PLLC; Scott T. Wakeman; Mark A. Ussai (57) ABSTRACT

A grounding brush assembly includes a grounding brush with a plurality of conductive fibers and a mounting plate. The mounting plate includes a radial main body, a plurality of retaining tongues extending from the main body for axially and radially retaining the brush, and either a plurality of centering tabs or an annular centering flange extending from the main body and at least locally surrounding the grounding brush while remaining radially separated therefrom. The centering tabs or flange have/has an outer surface defining the outer diameter of the mounting plate. The mounting plate further includes at least one mounting tongue which protrudes outwardly with respect to the outer surface of the centering means and which is flexible in the radial direction.

11 Claims, 9 Drawing Sheets

(58) Field of Classification Search
CPC ...... H01R 39/24; H01R 4/64; H01R 2201/10; F16C 19/06; F16C 41/002; F16C 2226/76; H05F 3/02
See application file for complete search history.

(56) References Cited

U.S. PATENT DOCUMENTS

| | | |
|---|---|---|
| 2012/0207420 A1 | 8/2012 | Bostwick |
| 2019/0296617 A1 | 9/2019 | Hubert et al. |
| 2021/0021180 A1 | 1/2021 | Hubert et al. |
| 2021/0044178 A1 | 2/2021 | Weber et al. |
| 2021/0310518 A1 | 10/2021 | Berruet et al. |
| 2021/0310520 A1 | 10/2021 | Arnault et al. |
| 2021/0364041 A1 | 11/2021 | Berruet et al. |
| 2023/0013562 A1 | 1/2023 | Schamin et al. |

FOREIGN PATENT DOCUMENTS

| | | |
|---|---|---|
| FR | 3108956 A1 | 10/2021 |
| FR | 3109036 A1 | 10/2021 |
| FR | 3110650 A1 | 11/2021 |
| FR | 3110651 A1 | 11/2021 |
| WO | 2019037807 A1 | 2/2019 |

OTHER PUBLICATIONS

Preliminary Search Report and Written Opinion from the French Patent Office dated Oct. 24, 2022 in related No. FR2201203, and translation thereof.
Unpublished U.S. Appl. No. 18/163,308.

\* cited by examiner

GROUNDING BRUSH ASSEMBLY

CROSS-REFERENCE

This application claims priority to French Patent Application No. 2201203 filed on Feb. 11, 2022, the entire contents of which are fully incorporated herein by reference.

BACKGROUND OF THE INVENTION

The present invention relates to the field of grounding devices for controlling the shaft current generated in electric motors or machines, and in particular to grounding brush assemblies.

In an electric motor or machine, at least one rolling bearing is typically mounted between the housing of the electric motor or machine and the rotary shaft so as to support the shaft.

In operation, as the shaft rotates, an electrical potential difference can appear between the shaft and the housing of the electric motor or machine, which produces an electric current between the inner race of the rolling bearing, which is secured to the shaft, and the outer race secured to the housing.

The electric current passing through the components of the rolling bearing can damage these components, in particular the rolling elements and the raceways formed on the inner and outer races. Electrical discharges can also generate vibrations.

In order to remedy these drawbacks, it is known to earth or ground the rotary shaft by using a grounding brush comprising conductive fibers. The grounding brush is generally mounted in the bore of the housing of the electric motor in such a way that the free ends of the fibers are in radial contact with the outer surface of the rotary shaft.

By virtue of the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

US Patent Publication No. 2021/0021180 discloses a grounding brush assembly comprising a grounding brush including a plurality of conductive fibers, and an annular mounting plate provided with a plurality of tongues for radially and axially retaining the grounding brush and with an annular outer flange radially surrounding the brush and the tongues. The tongues are formed by plastic deformation of the mounting plate.

Conventionally, the annular outer flange of the mounting plate is mounted in the bore of the housing of the associated electric motor by radial interference.

However, there is still a risk of axial movement of the grounding brush assembly inside the bore of the housing.

The present invention aims to remedy this drawback.

SUMMARY OF THE INVENTION

The invention relates to a grounding brush assembly comprising a grounding brush, provided with a plurality of conductive fibers, and a brush mounting plate configured to axially and radially retain the brush.

The mounting plate comprises a main body, a plurality of retaining tongues for axially and radially retaining the brush which extend from the main body, and a centering means which extends from the main body, which is at least partially offset radially outwards with respect to the tongues and which at least locally surrounds the grounding brush while remaining radially separated or spaced therefrom.

The centering means is provided with an outer surface defining the outer diameter of the mounting plate.

According to a general feature, the mounting plate further comprises at least one mounting tongue which protrudes outwardly with respect to the outer surface of the centering means and which is flexible or deflectable in the radial direction.

The at least one mounting tongue of the mounting plate is intended to protrude into a groove formed in the bore of the housing of the associated electric motor.

When the grounding brush assembly is installed within the housing, the free end of each mounting tongue of the mounting plate moves or deflects radially inwardly, counter to its elasticity, due to the radial contact between the tongue and the bore of the housing.

Once it is positioned opposite the groove in the bore of the housing, the tongue, due to its elasticity, at least partially resumes its original position in the free state and therefore moves or deflects radially outwardly. The mounting tongue(s) of the mounting plate ensures that the grounding brush assembly is axially retained relative to the housing. The axial retention is obtained by the axial contact between the free end of the mounting tongue and one of the edges of the groove in the housing.

The mounting tongue(s) of the mounting plate therefore ensures an axial retention function of the assembly relative to the housing.

Preferably, each mounting tongue of the mounting plate is formed from the centering means of the mounting plate. In other words, the tongue is produced in one piece with or integral with the centering portion.

The mounting tongue(s) may each be formed by cutting and bending of a section of the centering means of the mounting plate.

In an advantageous embodiment, the mounting plate comprises at least two mounting tongues which protrude outwardly with respect to the outer surface of the centering means and which are spaced apart regularly or evenly in the circumferential direction. This promotes the passage of the electric current.

According to a first design or embodiment, the centering means comprises an annular flange, the mounting tongue(s) protruding outwardly with respect to the outer surface of the flange. The flange may extend axially from the main body of the mounting plate.

According to a second alternative design/embodiment, the centering means comprises a plurality of centering tabs which are spaced apart from one another in the circumferential direction. Each centering tab includes a connecting portion extending outwardly from the main body and a centering portion extending axially from the connecting portion and locally surrounding the grounding brush while remaining radially separated or spaced from the brush. The centering portion is delimited in the circumferential direction by two free front faces. Each mounting tongue protrudes outwardly with respect to the outer surface of the centering portion of a separate one of the centering tabs.

The centering portions of the centering tabs are independent of the retaining tongues and of the body of the mounting plate. There is no connection in the circumferential direction between the front faces of the centering portions of the tabs and between the retaining tongues and the body.

This solution makes it possible to have a universal design irrespective of the radial distance present between the bore of the housing of the electric motor and the outer surface of the rotary shaft, between which the grounding brush assembly is intended to be mounted.

One and the same type of grounding brush can be adapted to various outer diameters by adapting the radial dimension of the centering tabs of the mounting plate.

Furthermore, the design of the mounting plate with centering tabs makes it possible to simplify mounting within the bore of the housing of the associated electric motor in view of the more flexible nature of the tabs in comparison with the first design with an annular outer flange.

Preferably, the connecting portion of each centering tab of the mounting plate extends outwardly from a cylindrical outer surface of the main body.

In one embodiment, the connecting portion extends radially outwardly from the cylindrical outer surface of the main body. The connecting portion may extend only radially. As an alternative, the connecting portion may extend both radially and axially, that is to say obliquely.

The centering portion of each centering tab of the mounting plate may extend from a large-diameter edge of the radial portion. This facilitates the manufacture of the mounting plate, in particular when the latter is produced by cutting and stamping.

Advantageously, the centering portion of at least one of the centering tabs of the mounting plate extends obliquely outwardly.

This also increases the flexible nature of the centering tab in the radial direction and also facilitates the mounting of the mounting plate within the bore of the housing of the associated electric motor. Moreover, this reduces the stresses that may be created in the connecting zone between the radial portion and the centering portion of the centering tab during mounting. Furthermore, this also limits the risk of axial movement of the mounting plate of the assembly inside the bore of the housing.

As an alternative, it remains possible to make provision for the centering portion of each centering tab of the mounting plate to extend only axially.

In one embodiment, the centering tabs of the mounting plate extend axially from the same side of the mounting plate as the tongues. As an alternative, the centering tabs may extend axially from the side of the plate opposite to the side from which the tongues extend.

In a particular embodiment, the root of each centering tab of the mounting plate is positioned in the circumferential direction between two successive retaining tongues.

In one embodiment, a circumferential space is formed between each centering tab of the mounting plate and each adjacent retaining tongue. In this case, the centering tabs of the mounting plate and the tongues extend axially from the same side of the main body.

Each retaining tongue of the mounting plate may extend axially from the cylindrical outer surface of the main body.

The body of the mounting plate may comprise two opposite front faces which delimit the axial thickness of the body.

The retaining tongues and the centering tabs protrude with respect to one of these front faces of the body. Advantageously, the retaining tongues axially hold the brush in axial abutment against the one front face of the body.

In one embodiment, the number of retaining tongues is identical to the number of centering tabs, each tongue being disposed between two adjacent centering tabs. As an alternative, the number of retaining tongues differs from the number of centering tabs.

Preferably, the body of the mounting plate is annular. As an alternative, the body may be open at a point around its circumference (i.e., formed with a circumferential gap).

The mounting plate may be made of an electrically conductive material.

In one embodiment, the brush comprises a support, the plurality of conductive fibers being mounted in the support.

The present invention also relates to an electric machine or motor comprising a housing, a shaft and at least one grounding brush assembly as defined above, mounted radially between the housing and the shaft, and in radial contact with the shaft, in particular by way of the free end of the conductive fibers of the brush, the tongue of the mounting plate of the assembly protruding into a groove in the bore of the housing.

BRIEF DESCRIPTION OF THE SEVERAL VIEWS OF THE DRAWINGS

The present invention will be better understood on studying the detailed description of embodiments, given by way of non-limiting examples and illustrated by the appended drawings, in which.

DETAILED DESCRIPTION OF THE INVENTION

Figure 1:
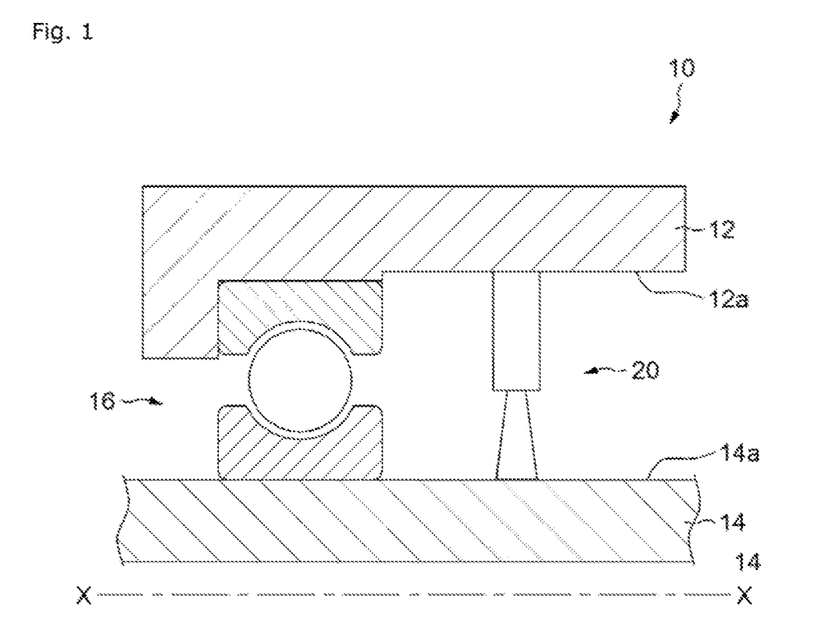
FIG. 1 is a view in axial section of a grounding brush assembly mounted radially between a rotary shaft and a housing of an electric motor.

FIG. 1 shows, in axial section, part of an electric motor 10 or machine comprising a fixed housing 12 and a rotary shaft 14 rotatable about a central axis X-X, which is supported radially by a rolling bearing 16. In this instance, the bearing is of the ball type. Alternatively, the bearing 16 may include other types of rolling elements (e.g., cylindrical rollers, needles, etc.) or be formed as a journal bearing.

The motor 10 further comprises a grounding brush assembly 20 which is mounted radially between the bore 12a of the housing 12 and the outer cylindrical surface 14a of the rotary shaft 14.

The grounding brush assembly 20 serves to continuously dissipate the electrical charge accumulating on the shaft 14 of the motor 10 when the motor 10 is in operation, by transferring this charge to the housing 12.

With reference to FIGS. 2 to 5, a grounding brush assembly 20 according to a first example or embodiment of the invention will now be described.

Figure 2:
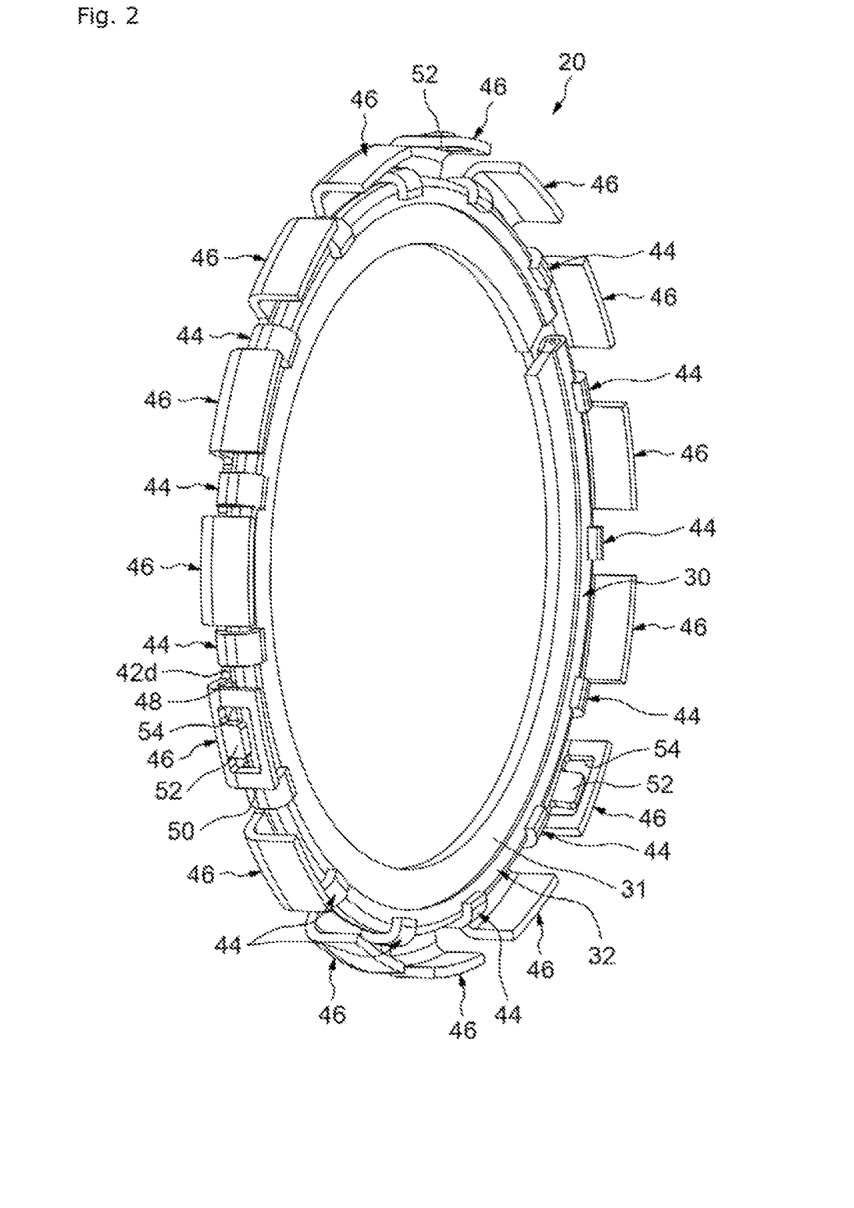
FIG. 2 is a perspective view of a grounding brush assembly according to a first exemplary embodiment of the invention.
Figure 3:
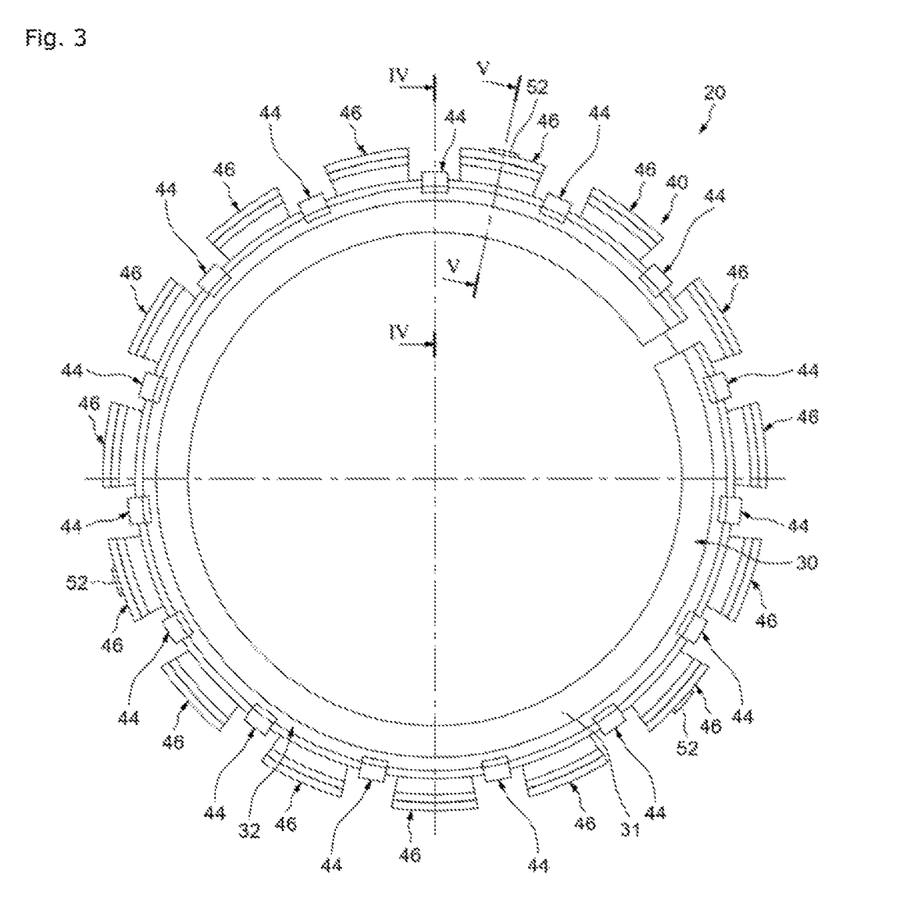
FIG. 3 is a front view of the grounding brush assembly in FIG. 2.

As illustrated in FIGS. 2 and 3, the grounding brush assembly 20 has a generally annular shape. The assembly 20 comprises a grounding brush 30 and a brush mounting plate 40 which is configured to axially and radially retain the brush 30.

The brush 30 comprises a plurality of conductive individual fibers 31 which are intended to come around or be disposed about the rotary shaft 14 of the motor 10. The conductive fibers 31 may be made of carbon, stainless steel, conductive plastics, such as fibers made of acrylic or nylon, etc.

The brush 30 further comprises a holding or support member 32, in the interior of which the conductive fibers 31 are mounted. In the exemplary embodiment illustrated, the support 32 is in the form of an open ring.

Figure 4:
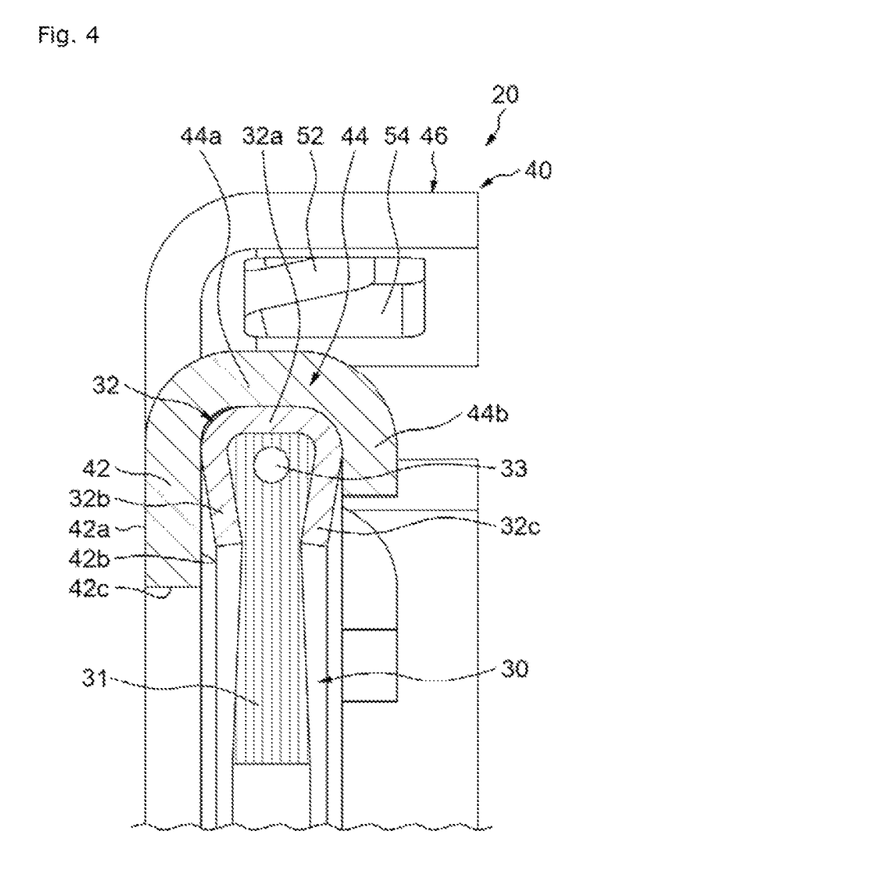
FIG. 4 is a view in section along line IV-IV in FIG. 3.

As illustrated more clearly in FIG. 4, the support 32 comprises an annular axial portion 32a and two annular lateral portions 32b, 32c extending radially inwards in order to grip the conductive fibers 31. The axial portion 32a and the two lateral portions 32b, 32c delimit a channel which is radially open on the inside and in the interior of which one end of the conductive fibers 31 is positioned.

In the example illustrated, the lateral portions 32b, 32c extend obliquely inwardly from the axial portion 32a. As a variant, the lateral portions 32b, 32c could extend substantially radially. In the example illustrated, the conductive fibers 31 are bent around a connecting wire 33 of the support 32.

The free distal end of the conductive fibers 31 is intended to come into radial contact with the outer surface 14a of the rotary shaft 14 of the motor 10.

The brush 30 is in the form of an open ring having a first end which is circumferentially spaced apart from a second end which is circumferentially opposite the first end, as shown in FIGS. 2 and 3. Such a circumferential spacing between two ends of the brush 30 allows the brush 30 to adapt to various diameters of the shaft 14 of the motor 10.

Generally, the first end of the brush 30 and the second end are not attached to one another, but may be in contact with one another. As a variant, it remains possible to attach the first end and the second end of the brush 30 to one another.

The mounting plate 40 of the brush 30 comprises an annular radial main body 42 and a plurality of "retainer" tongues 44 extending from the main body 42 for axially and radially retaining the brush 30.

As will be described in more detail below, the mounting plate 40 also comprises a plurality of mounting and centering sectors or tabs 46 extending from the main body 42. The tabs 46 form a means for centering the mounting plate 40.

As will also be described below, the mounting plate 40 also comprises at least one and preferably a plurality of "mounting" tongues 52 protruding radially outwardly with respect to the tabs 46.

Referring again to FIG. 4, the body 42 comprises two opposite front faces 42a, 42b which delimit the axial thickness of the body. The body 42 also comprises a cylindrical bore 42c and a cylindrical axial outer surface 42d (FIG. 2) radially opposite to the bore 42c.

Each retainer tongue 44 extends from the cylindrical outer surface 42d of the body 42. Each tongue 44 protrudes axially with respect to the front face 42b of the body 42. Each tongue 44 locally radially surrounds the support 32 of the brush 30 and is in radial contact with the axial portion 32a of the support 32. The support 32 of the grounding brush 30 is held axially bearing against the front face 42b of the body 42 by the tongues 44. As such, the tongues 44 serve for axially and radially retaining the grounding brush 30.

Each retainer tongue 44 includes an axial portion 44a extending axially from the cylindrical outer surface 42d of the body 42, and a radially inwardly folded portion 44b which is provided at the free end of the axial portion 44a. The axial portion 44a of each tongue 44 is in the form of a cylindrical portion. The folded portion 44b of each tongue 44 serves for axially retaining the grounding brush 30. The folded portion 44b of each tongue 44 is in axial contact against the lateral portion 32c of the support 32. The tongues 44 are in this case identical or substantially identically formed.

As illustrated in FIGS. 2 and 3, the tongues 44 of the mounting plate 40 are spaced apart from one another in the circumferential direction, in a regular or evenly spaced manner. As an alternative, it could be possible to provide an irregular circumferential spacing (i.e., circumferentially staggered). The tongues 44 are distributed circumferentially around the main body 42.

As indicated above, the mounting plate 40 also comprises a plurality of centering tabs 46 extending from the main body 42. The tabs 46 extend from the cylindrical outer surface 42d of the body 42.

Figure 5:
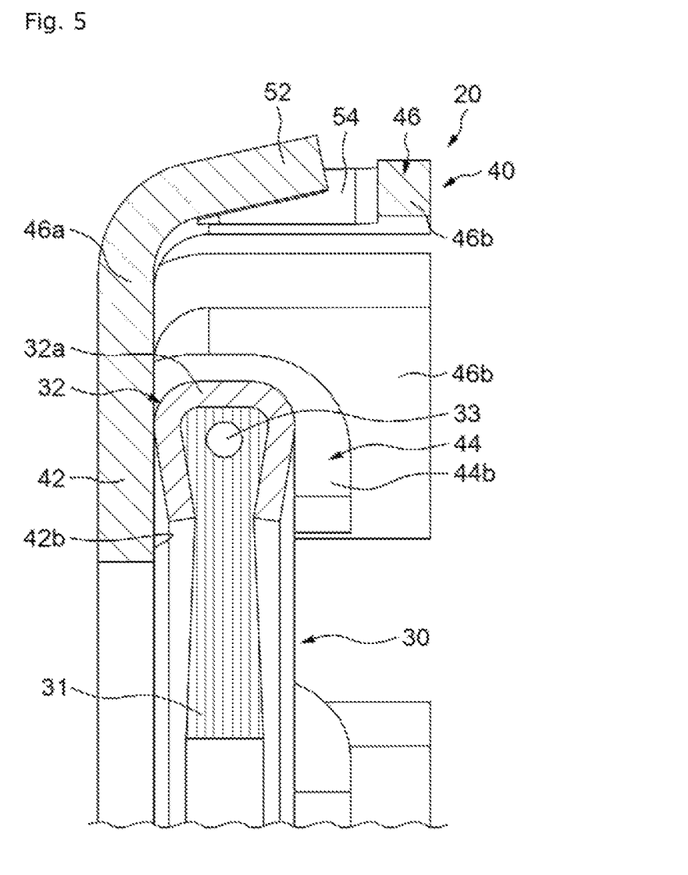
FIG. 5 is a view in section along line V-V in FIG. 3.
Figure 6:
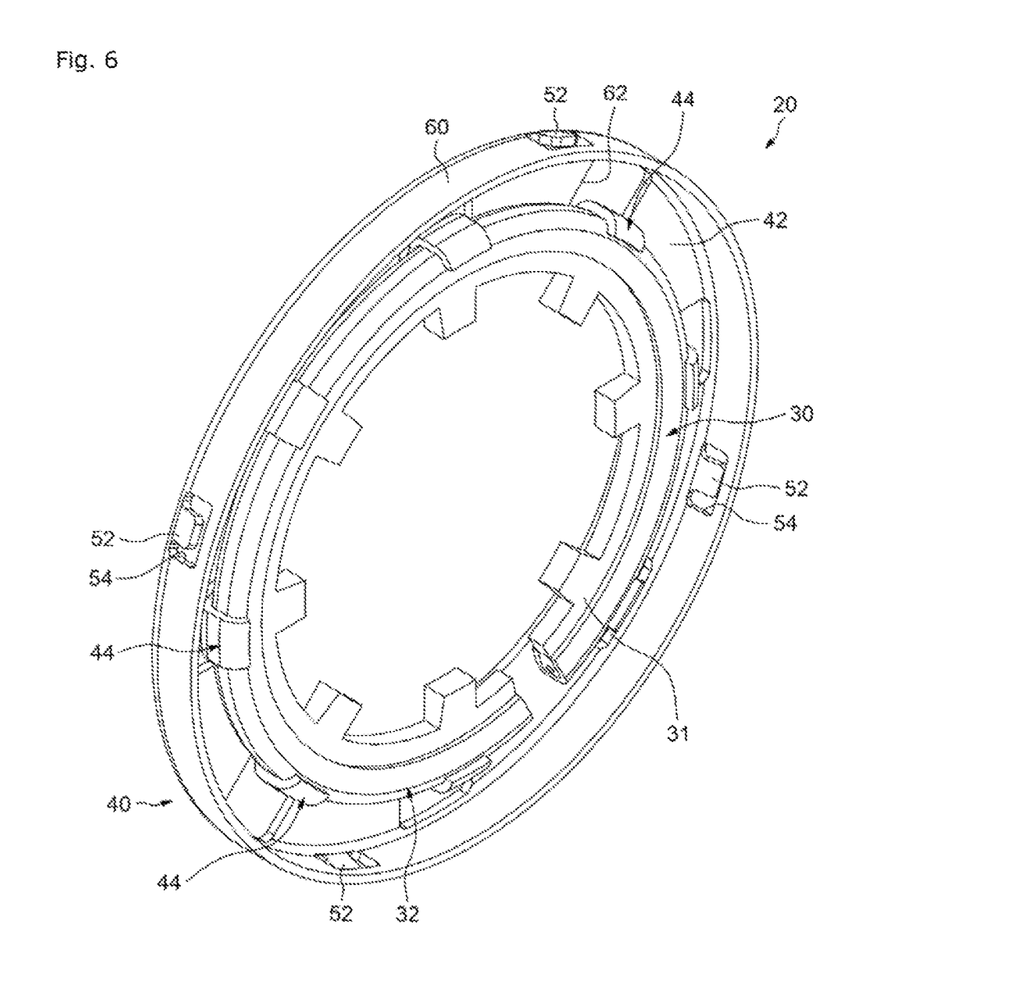
FIG. 6 is a perspective view of a grounding brush assembly according to a second exemplary embodiment of the invention.
Figure 7:
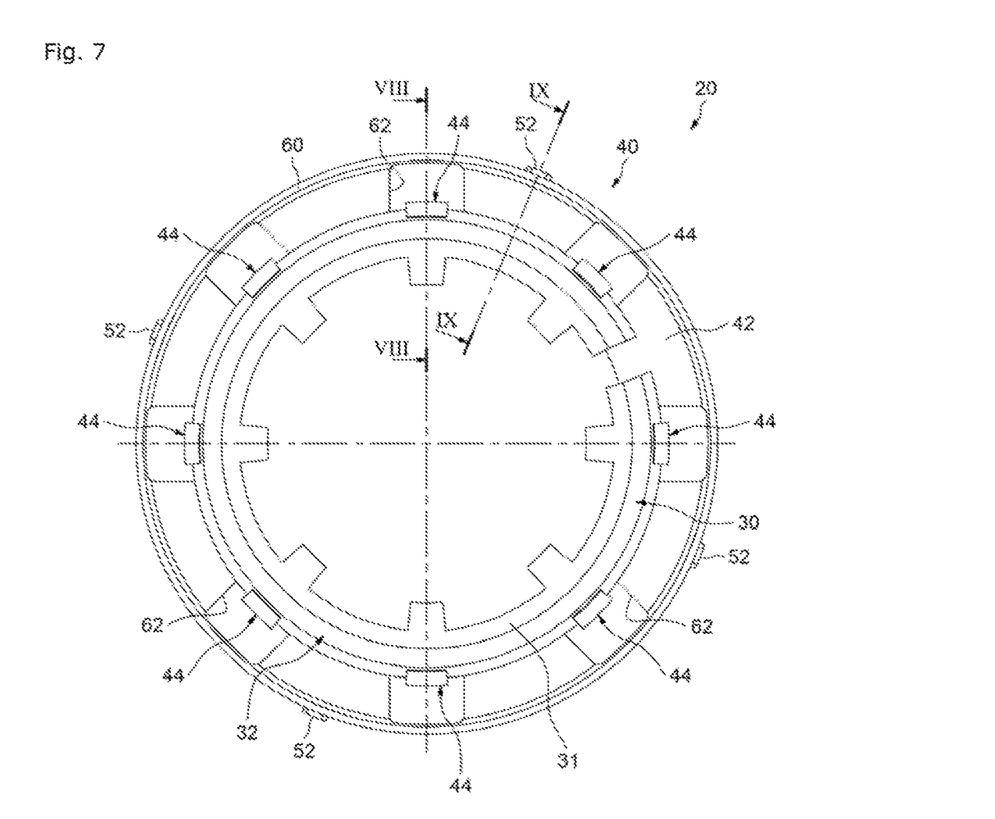
FIG. 7 is a front view of the grounding brush assembly in FIG. 6.
Figure 8:
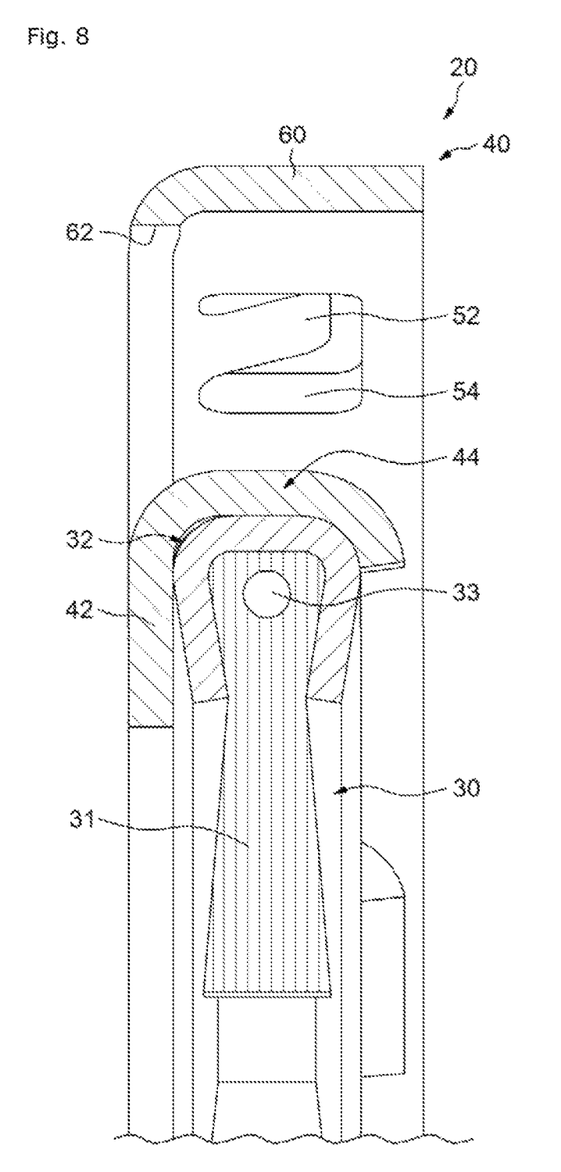
FIG. 8 is a view in section along line VIII-VIII in FIG. 7.
Figure 9:
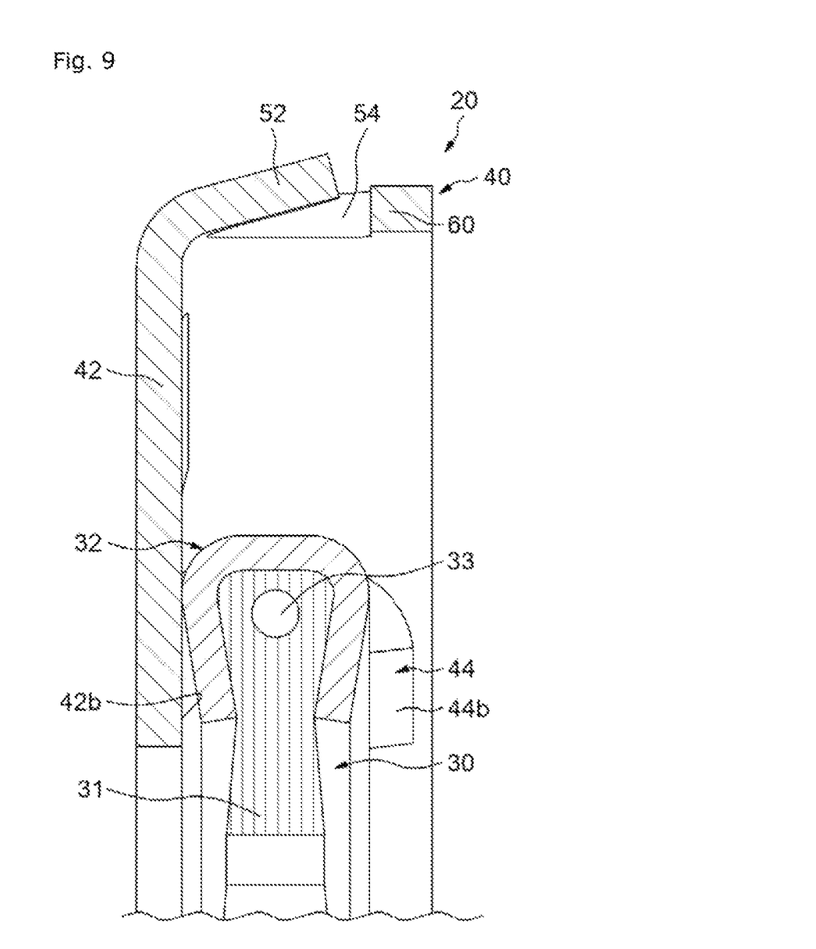
FIG. 9 is a view in section along line IX-IX in FIG. 7.

Referring to FIG. 5, each centering tab 46 protrudes axially with respect to the front face 42b of the body 42. Each tab 46 locally radially surrounds the support 32 of the brush 30 while remaining separated therefrom (i.e., radially spaced apart from the brush 30). The centering tabs 46 are at least partially offset radially outwardly with respect to the tongues 44.

The tabs 46 extend axially from the same side of the body 42 as the tongues 44. As an alternative, the centering tabs 46 could extend axially from the opposite side of the body 42 from the tongues 44. Each tab 46 is preferably formed at least generally identical to each other tab 46.

Each centering tab 46 includes a radial portion 46a extending radially outwardly from the body 42 and a centering portion 46b extending axially from the radial portion 46a and locally radially surrounding the support 32 while remaining radially separated therefrom (i.e., spaced radially apart from the support 32). The centering portions 46b of the tabs 46 collectively define the outer diameter of the mounting plate 40.

The radial portion 46a of each centering tab 46 forms a connecting portion which connects the associated centering portion 46b to the body 42. The radial portion 46a of each tab 46 extends radially outwardly from the outer surface of the body 42.

The centering portion 46b extends axially from a large-diameter edge of the associated radial portion 46a. The centering portion 46b extends generally axially. The centering portion 46b of each tab 46 is in the form of a cylindrical portion. The bore in the centering portion 46b of each tab 46 is radially spaced apart from the support 32 of the brush 30 by a non-zero radial distance. The outer surfaces of the centering portions 46b of the tabs 46 collectively define the outer surface of the tabs 46, which defines the outer diameter of the mounting plate 40. The outer surface of each centering portion 46b is radially opposite to the bore in each portion 46b. In this exemplary embodiment, the centering portions 46b of the tabs 46 are offset radially outwardly with respect to the tongues 44.

Referring again to FIG. 2, the centering portion 46b of each centering tab 46 includes two opposite front or "axial" faces 48, 50 (i.e., the faces 48, 50 extend along a central axis) which delimit the centering portion 46b in the circumferential direction. The centering portion 46b of each tab 46 extends in a continuous manner in the circumferential direction between its two front faces 48, 50. The front/axial faces 48, 50 of each centering portion 46b are free. There is no connection between the centering portion 46b of each centering tab 46 and either the body 42 or the tongues 44.

As illustrated in FIGS. 2 and 3, the centering tabs 46 are spaced apart from one another in the circumferential direction, in a regular or evenly spaced manner. As an alternative, it could be possible to provide an irregular or staggered circumferential spacing. The tabs 46 are distributed circumferentially around the main body 42.

Each centering tab 46 is positioned in the circumferential direction between two immediately successive retaining tongues 44 so as to be spaced apart in the circumferential direction from the two immediately adjacent tongues 44. That is, a circumferential space is formed between each centering tab 46 and each immediately adjacent retaining tongue 44. As such, there is no portion which connects a tab 46 to an adjacent tongue 44 in the circumferential direction.

In the exemplary embodiment, each centering tab 46 has a circumferential dimension greater than that of the retaining tongues 44. By way of indication, the circumferential dimension of the tabs 46 may be, for example, between 10° and 45°. In the exemplary embodiment illustrated, the number of centering tabs 46 is equal to the number of retaining tongues 44. As an alternative, it is possible to provide a number of tabs 46 which differs from the number of the tongues 44.

In the exemplary embodiment illustrated, the centering tabs 46 have an axial dimension substantially equal to the retaining tongues 44. Alternatively, the tabs 46 may each be formed with an axial dimension different than the axial dimension of each tongue 44.

As indicated above, the mounting plate 40 also comprises at least one and preferably a plurality of mounting tongues 52 protruding radially outwardly with respect to the centering tabs 46, as best shown in FIG. 5. Each mounting tongue 52 is formed on a separate one of the centering tabs 46, specifically on the central portion 46b of the associated tab 46. Each tongue 52 protrudes radially outwardly with respect to the outer surface of the centering portion 46b of the associated tab 46. Each tongue 52 preferably extends obliquely outwardly and is flexible or deflectable in the radial direction.

In the exemplary embodiment illustrated, the root of each mounting tongue 52 is positioned axially on the side of the radial portion 46a of the associated centering tab 46. As an alternative, it could be possible to make provision for the root of each tongue 52 to be positioned axially on the side of the free end of the associated centering portion 46b.

Each tongue 52 is formed by cutting and bending of the centering portion 46b of the associated tab 46. During this cutting operation, a window 54 is formed on the centering portion 46b in such a way as to allow the associated tongue 52 to remain. Each window 54 is a through-window and each tongue 52 both extends inside the window 54 and protrudes radially outwardly from the window 54.

In the exemplary embodiment illustrated, the mounting plate 40 comprises three mounting tongues 52 which are spaced apart from one another in the circumferential direction in a regular or evenly spaced manner.

As an alternative, it is possible to provide a greater or smaller number of tongues 52, for example, one or two tongues 52 or four or more tongues 52. Preferably, the number of tongues 52 is at least two. Also preferably, in the case of a plurality of tongues 52, the tongues 52 are regularly or evenly spaced apart in the circumferential direction.

Each mounting tongue 52 has a circumferential dimension substantially smaller than that of the associated centering tab 46. By way of indication, the circumferential dimension of the tongues 52 may, for example, be between 3° and 10°. The tongues 52 in the exemplary embodiment are identical to each other.

The mounting plate 40 is preferably produced by cutting and stamping. The mounting plate 40 is made of a conductive material such as aluminum, stainless steel, bronze, copper or another appropriate material.

Each mounting tongue 52 of the mounting plate 40 is intended to protrude into and engage with a groove formed in the bore 12a of the housing 12 of the associated electric motor 10. The groove may be a single annular groove engaged by all of the mounting tongues 52 or alternatively a plurality of discrete grooves, each groove receiving a separate one of the tongues 52 of the mounting plate 40.

When the grounding brush assembly 20 is installed axially into the housing 12 of the associated electric motor 10, the free ends of the mounting tongues 52 of the mounting plate 40 move or deflect radially inwardly, counter to their elasticity, due to the radial contact between the tongues 52 and the bore 12a of the housing 12. Once the tongues 52 of the mounting plate 40 are positioned opposite the groove in the bore 12a of the housing 12, the tongues 52 of the mounting plate 40, due to their elasticity, at least partially resume their original position in the free state and serve to axially retain the assembly 20 relative to the housing 12. The axial retention is obtained by the axial contact between the free ends of the tongues 52 of the mounting plate 40 and one of the edges of the groove in the housing 12.

In this exemplary embodiment, the centering portions 46b of the tabs 46 of the mounting plate 40 extend only axially. As a variant, at least some or all of the centering portions 46b of the tabs 46 may extend obliquely outwardly, that is to say both axially and radially.

The exemplary embodiment illustrated in FIGS. 6 to 9, in which identical elements bear the same references, differs from the first example by the design of the mounting plate 40 of the assembly 20.

In this example, the centering tabs 46 of the mounting plate 40 of the first example are replaced by an annular flange 60 and the body 42 has an increased or greater radial dimension. In this embodiment, the body 42 extends radially beyond the retaining tongues 44. The flange 60 forms a means for centering the mounting plate 40.

The flange 60 extends axially from the body 42, preferably from a large-diameter edge of the body 42. The flange 60 extends axially, specifically protruding axially with respect to the front face 42b of the body 42. The flange 60 radially surrounds the support 32 of the brush 30 while remaining separated or spaced therefrom. The flange 60 is offset radially outwardly with respect to the retaining tongues 44. Preferably, the flange 60 extends axially from the same side of the body 42 as the retaining tongues 44. Alternatively, the flange 60 may extend axially from the opposite side of the body 42 as the tongues 44. The bore in the flange 60 is radially spaced apart from the support 32 of the brush by a non-zero radial distance. The outer surface of the flange 60, radially opposite to the bore in the flange 60, defines the outer diameter of the mounting plate 40.

In this embodiment, the body 42 is provided with a plurality of through-openings 62 which are formed in its thickness and which are spaced apart from one another in the circumferential direction. These openings 62 are formed during the partial cutting of the body 42 to form the retaining tongues 44.

The mounting tongues 52 are formed on the flange 60. The tongues 52 are preferably identical to those of the first exemplary embodiment. Each tongue 52 protrudes radially outwardly with respect to the flange 60, specifically radially outwardly with respect to the outer surface of the flange 60. Each tongue 52 preferably extends obliquely outwardly, i.e., both radially and axially. Each tongue 52 is flexible or deflectable in the radial direction.

In the depicted exemplary embodiment, the root of each tongue 52 is positioned axially on the body 42. As an alternative, the root of each tongue 52 may be positioned axially on the side of the free end of the flange 60.

Each tongue 52 is preferably formed by cutting and bending of the flange 60. During this cutting operation, the associated window 54 is formed on the flange 60 in such a way as to allow the associated tongue 52 to remain, each window 54 being a through-window. Each tongue 52 both extends inside the window 54 and protrudes radially outwardly.

In the exemplary embodiment as depicted, the mounting plate 40 comprises four mounting tongues 52 which are spaced apart from one another in the circumferential direction in a regular or evenly spaced manner. As an alternative, it is possible to provide a greater or smaller number of tongues 52.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:
a grounding brush including a plurality of conductive fibers, and
a brush mounting plate including a main body, a plurality of retaining tongues extending from the main body for axially and radially retaining the brush, a centering means extending from the main body, the centering means being at least partially offset radially outwardly with respect to the retaining tongues and at least locally surrounding and being radially spaced from the grounding brush, the centering means having an outer surface defining the outer diameter of the mounting plate, and at least one mounting tongue protruding radially outwardly from the outer surface of the centering means and being flexible in the radial direction.

2. The assembly according to claim 1, wherein the mounting tongue of the mounting plate is formed from the centering means of the mounting plate.

3. The assembly according to claim 2, wherein the mounting tongue of the mounting plate is formed by cutting and bending of the centering means of the mounting plate.

4. The assembly according to claim 1, wherein the mounting plate includes at least two mounting tongues which protrude outwardly with respect to the outer surface of the centering means and which are spaced apart evenly in the circumferential direction.

5. The assembly according to claim 1, wherein the centering means of the mounting plate include a plurality of centering tabs extending from the main body and spaced apart from one another in the circumferential direction, each centering tab including a connecting portion extending outwardly from the main body and a centering portion extending at least axially from the connecting portion and having an outer surface, each centering portion locally surrounding and being radially spaced from the grounding brush and being delimited in the circumferential direction by two free front faces, the at least one mounting tongue protruding outwardly with respect to the outer surface of the centering portion of one of the plurality of centering tabs.

6. The assembly according to claim 5, wherein the centering portion of at least one of the centering tabs of the mounting plate extends obliquely outwardly.

7. The assembly according to claim 1, wherein the centering means of the mounting plate includes an annular flange with an outer surface, the at least one mounting tongue protruding outwardly with respect to the outer surface of the flange.

8. The assembly according to claim 7, wherein the flange extends axially from the main body of the mounting plate.

9. The assembly according to claim 1, wherein the brush includes a support, the plurality of conductive fibers being mounted in the support.

10. An electric motor comprising a housing, a shaft and at least one grounding brush assembly according to claim 1, the grounding brush assembly being mounted radially between the housing and the shaft and being in radial contact with the shaft, the at least one mounting tongue of the mounting plate of the grounding brush assembly protruding into a groove in a bore of the housing.

11. A grounding brush assembly for transferring electrical charge accumulating on a shaft to a fixed housing, the housing having a bore with at least one groove, the grounding brush assembly comprising:
a grounding brush including a plurality of conductive fibers disposed about the shaft and contacting the outer surface of the shaft; and
a brush mounting plate including a main body, a plurality of retaining tongues integrally formed with and extending from the main body for axially and radially retaining the brush, a centering means integrally formed with and extending from the main body, the centering means being at least partially offset radially outwardly with respect to the retaining tongues and at least locally surrounding and being radially spaced from the grounding brush, the centering means having an outer surface defining the outer diameter of the mounting plate, and at least one mounting tongue protruding radially outwardly from the outer surface of the centering means, being flexible in the radial direction and configured to engage with the at least one groove of the bore of the housing so as to axially retain the grounding brush assembly relative to the housing.

* * * * *